United States Patent [19]

Kaneko

[11] Patent Number: 5,137,650

[45] Date of Patent: Aug. 11, 1992

[54] LUBRICATING OIL COMPOSITION CONTAINING A FLUOROALKYL GROUP-CONTAINING ALCOHOL AND A POLYETHER COMPOUND

[75] Inventor: Masato Kaneko, Ichihara, Japan

[73] Assignee: Idemitsu Kosan Co. Ltd., Tokyo, Japan

[21] Appl. No.: 651,414

[22] PCT Filed: Jun. 5, 1990

[86] PCT No.: PCT/JP90/00725

§ 371 Date: Feb. 11, 1991

§ 102(e) Date: Feb. 11, 1991

[87] PCT Pub. No.: WO90/15126

PCT Pub. Date: Dec. 13, 1990

[30] Foreign Application Priority Data

Jun. 9, 1989 [JP] Japan ................. 1-146962

[51] Int. Cl.$^5$ ............ C10M 105/54; C10M 131/08; C10M 169/04; C25D 11/00
[52] U.S. Cl. ...................... 252/54; 252/68; 252/58; 252/52 A
[58] Field of Search ............ 252/68, 54, 52 A, 58, 252/67

[56] References Cited

U.S. PATENT DOCUMENTS

| | | | |
|---|---|---|---|
| 2,559,629 | 12/1948 | Berry | 252/58 |
| 3,426,078 | 2/1969 | Hill | 252/54 |
| 3,505,229 | 4/1970 | Skehan | 252/58 |
| 3,647,889 | 3/1972 | Anello et al. | 252/54 |
| 3,647,891 | 3/1972 | Loudas et al. | 252/54 |
| 4,203,856 | 5/1980 | Pardee | 252/54.6 |
| 4,455,247 | 6/1984 | Nakayama et al. | 252/68 |
| 4,900,463 | 2/1990 | Thomas et al. | 252/54 |

FOREIGN PATENT DOCUMENTS

| | | |
|---|---|---|
| 48-89183 | 11/1973 | Japan . |
| 55-58298 | 4/1980 | Japan . |
| 57-51795 | 3/1982 | Japan . |
| 62-146996 | 6/1987 | Japan . |
| 62-187799 | 8/1987 | Japan . |
| 62-288692 | 12/1987 | Japan . |
| 1-115999 | 5/1989 | Japan . |
| 1-319589 | 12/1989 | Japan . |

Primary Examiner—Prince Willis, Jr.
Assistant Examiner—J. Silbermann
Attorney, Agent, or Firm—Antonelli, Terry, Stout & Kraus

[57] ABSTRACT

Disclosed is a lubricating oil composition containing a fluoroalkyl group-containing alcohol represented by the general formula:

$$R_f-R^1-OH \qquad (I)$$

(wherein $R^1$ is an alkylene group having 2 to 15 carbon atoms, and $R_f$ is a fluoroalkyl group having 5 to 16 carbon atoms, providing that the number of fluorine atoms in $R_f$ is at least $2n-3$ (wherein n is the number of carbon atoms in $R_f$), and each carbon atom in $R_f$ is bonded to at least one fluorine atom) and a polyether compound. This composition has excellent anti-seizure property and excellent high-temperature solubility in a refrigerant.

7 Claims, No Drawings

LUBRICATING OIL COMPOSITION CONTAINING A FLUOROALKYL GROUP-CONTAINING ALCOHOL AND A POLYETHER COMPOUND

TECHNICAL FIELD

The present invention relates to a lubricating oil composition, more particularly, to a lubricating oil composition comprising a specified alcohol and a polyether compound.

Because of its excellent anti-seizure property and a stable and favorable compatibility also shown in an atmosphere of refrigerant such as Flon (fluorohydrocarbon), the lubricating oil composition of the present invention is favorably used as a refrigerator oil or a heat-pump oil.

BACKGROUND ART

Recently, refrigerators have showed a marked tendency to become more compact and lighter with higher efficiency. The compressors of refrigerators have changed from reciprocating type to rotary type, and further an inverter has been mounted, and the temperature of the exhausted gas has been getting higher and higher by the recovery of the waste heat from heat pumps. As the refrigerant to be used for these refrigerators, fluoroethane refrigerants such as Flon-134a (1,1,1,2-tetrafluoroethane) or Flon-134 (1,1,2,2-tetrafluoroethane) have attracted attention as new refrigerants without bad effect on the ozone layer, and as a refrigerator oil having a high suitability to these refrigerants, polyglycol compounds have been proposed (e.g., Specification of U.S. Pat. No. 4,755,316).

On the other hand, fluoroalkyl group-containing alcohols can be prepared according to the method described in Japanese Patent Publication No. 8807/1977. It is known that the polymers obtained by polymerizing the ester of the fluoroalkyl group-containing alcohol with acrylic acid or methacrylic acid is used as a water-repellent oily agent, or the fluoroalkyl phosphate obtained through the reaction of said alcohol with phosphorus oxichloride is used as the surfactant.

The polyglycol compounds which are highly suitable for fluoroethane refrigerants are insufficient not only in lubricity (anti-seizure property) but also in hightemperature solubility to fluoroethane refrigerants, and accordingly have been desired for improvement in these properties.

DISCLOSURE OF THE INVENTION

The object of the present invention is to provide a polyether-based lubricating oil composition excellent in lubricity (anti-seizure property), and also in high-temperature solubility to slightly soluble refrigerants such as fluoroethane refrigerant.

The present invention provides a lubricating oil composition which comprises a fluoroalkyl group-containing alcohol represented by the general formula :

(wherein $R^1$ is an alkylene group having 2 to 15 carbon atoms (preferably 2 to 10), and $R_f$ is a fluoroalkyl group having 5 to 16 carbon atoms, providing that the number of fluorine atoms in $R_f$ is at least $2n-3$ (wherein n indicates the number of carbon atoms in $R_f$), and that at least one fluorine atom is bonded to each carbon atom in $R_f$) and a polyether compound. The present invention provides a process for effecting lubrication in a compressor-type refrigerator using fluorohydrocarbon as the refrigerant which comprises employing a lubricant containing the above-described composition as the main component, and further the present invention provides a compressor-type refrigerator system which comprises a compressor, a refrigerant consisting of fluorohydrocarbon, and a lubricant containing the above composition as the main component.

THE MOST PREFERRED EMBODIMENT TO CARRY OUT THE INVENTION

In the fluoroalkyl group-containing alcohol represented by the general formula (I), $R^1$ is an alkylene group having 2 to 15 carbon atoms (preferably 2 to 10), more specifically an ethylene group, a propylene group, a butylene group, a hexamethylene group, an octamethylene group, a methylethylene a methylpropylene group. $R_f$ is a fluoroalkyl group having 5 to 16 carbon atoms. If a fluoroalkyl group-containing alcohol in which $R_f$ having less than 5 carbon atoms is used, the anti-seizure property of the lubricating oil composition becomes undesirably insufficient, and if the number of carbon atoms is in excess of 16, the solubility to polyether compounds becomes undesirably lowered. If the number of fluorine atoms in $R_f$ is less than $2n-3$ (wherein n is the number of carbon atoms in $R_f$), fluoroalkyl group-containing alcohol becomes undesirably lowered in stability and solubility. In $R_f$, at least one fluorine atom is required to be bonded to each carbon atom, but $R_f$ is preferably a perfluoroalkyl group (that is, the number of fluorine atoms in $R_f$ is $2n+1$).

The boiling point of the fluoroalkyl group-containing alcohol represented by the above general formula (I) is preferably 140° C. or higher at ordinary pressure. If the boiling point is lower than 140° C., foaming and evaporation will occur while the lubricating oil composition is used, and anti-seizure property of said composition is unfavorably lowered.

The fluoroalkyl group-containing alcohol represented by the above general formula (I) is blended in the lubricating oil composition in the ratio of preferably 0.001 to 50% by weight, more preferably 0.1 to 30% by weight. If the amount of said alcohol to be blended is less than 0.001% by weight, the desired effect may sometimes fail to be obtained, and if it is in excess of 50% by weight, there is a fear of lowering in the stability in blending.

Said fluoroalkyl group-containing alcohol may be used singly or as the mixture of two or more kinds.

Specific examples of the fluoroalkyl group-containing alcohols represented by the above general formula (I) are perfluoroalkyl lower alkylalcohols such as perfluorohexylethyl alcohol, perfluorohexylbutyl alcohol, perfluorooctylethyl alcohol and the mixture thereof.

Examples of polyether compounds which can be used in the present invention are polyglycol derivatives (e.g., polyglycol, mono- or dialkylether thereof), and glycerol derivatives (e.g., glycerol polyoxyalkyl ether). As polyglycol derivatives or glycerol derivatives, the compounds represented by the formulae (II) to (V), for instance, can be used.

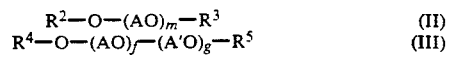

-continued

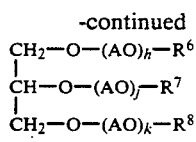  (IV)

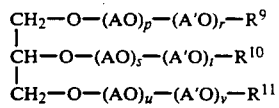  (V)

In each formula above, $R^2$ to $R^{11}$ are each a hydrogen atom or an alkyl group having 1 to 10 carbon atoms, A and A' are each an alkylene group having 2 to 4 carbon atoms (particularly preferably a propylene group), m is an integer of 5 or more, f+g is an integer of 5 or more, h, j and k are each an integer of 2 or more, and p+r, s+t and u+v are each an integer of 2 or more.

As the above-mentioned polyether compound, compounds having number-average molecular weight of about 300 to 3000, particularly 500 to 2000 are preferred. As the copolymer represented by the above-mentioned formula (III) or (V), random copolymers, block copolymers or other copolymers can be used.

The lubricating oil composition of the present invention can be prepared by adding the fluoroalkyl group-containing alcohol represented by the above-mentioned general formula (I) to above polyether compound, and if necessary, by adding also a synthetic oil (e.g., alkylbenzene) and/or a mineral oil (e.g., naphthene-based oil) thereto in an ordinary manner. In addition, various additives used in conventional lubricating oils, such as anti-load additives (e.g., extreme pressure agents, anti-wear agents, oiliness agents), chlorine-capturing agents, antioxidants, metal deactivators, defoaming agents, detergent dispersants, viscosity index improvers, rust preventatives, corrosion inhibitors, and pour point depressants can be used, if necessary.

The kinematic viscosity of the lubricating oil composition of the present invention is preferably 5 to 50 cSt, particularly 5 to 30 cSt at 100° C. If the viscosity is less than 5 cSt, anti-seizure property becomes insufficient, and if it is in excess of 50 cSt, heat-exchange efficiency becomes lowered, and both cases are unfavorable.

The present invention is explained in greater detail with reference to the following examples, providing that the scoope of the present invention is not restricted thereto.

EXAMPLES 1 to 8 and COMPARATIVE EXAMPLES 1 to 5

The lubricating oil composition having the composition shown in Table 1 was prepared, and evaluated by determination of high-temperature critical solution temperature and antiseizure property. The components used are as follows.

$G_1$: polypropylene glycol (number average-molecular weight=about 1000)

$G_2$: dimethyl ether of ethyleneoxide-propyleneoxide copolymer (number average-molecular weight=about 1100)

$G_3$: polypropyleneglycol monomethylether (number average-molecular weight=about 1000)

$G_4$: polypropyleneglYcol monobutylether (number average-molecular weight=about 1050)

$A_1$: perfluorohexyl/octyl (50:50) ethylalcohol $A_2$: perfluorohexylethylalcohol B: dioctylsulfide The determination of high-temperature critical solution temperature and anti-seizure property were carried out as follows.

High-temperature Critical Solution Temperature

In about 10 ml-glass pressure container, a lubricating oil sample and a refrigerant (Flon-134a) were placed in a ratio of 1:9, and the container was sealed. The resulting homogeneous solution was heated gradually, to measure the temperature at which the lubricating oil and the refrigerant was separated.

Anti-seizure Property

Evaluated by Falex Seizure Test. Seizure load (pound) was determined in accordance with ASTMD3233.

The results are shown in Table 1.

TABLE 1

| | Proportion of Composition (wt %) | | | | | | | High-temperature Critical Solution Temperature (°C.) | Anti-seizure Property (pound) |
| --- | --- | --- | --- | --- | --- | --- | --- | --- | --- |
| | $G_1$ | $G_2$ | $G_3$ | $G_4$ | $A_1$ | $A_2$ | B | | |
| Example 1 | 95 | — | — | — | 5 | — | — | 69.5 | 941 |
| Comparative Example 1 | 100 | — | — | — | — | — | — | 63.0 | 670 |
| Example 2 | — | 98 | — | — | 2 | — | — | 77.0 | 930 |
| Example 3 | — | 95 | — | — | 5 | — | — | 79.5 | 960 |
| Example 4 | — | 85 | — | — | 15 | — | — | 87.5 | 977 |
| Example 5 | — | 95 | — | — | — | 5 | — | 80.0 | 948 |
| Comparative Example 2 | — | 100 | — | — | — | — | — | 74.0 | 647 |
| Example 6 | — | — | 99 | — | — | 1 | — | 72.5 | 892 |
| Example 7 | — | — | 95 | — | 5 | — | — | 76.5 | 956 |
| Comparative Example 3 | — | — | 100 | — | — | — | — | 71.0 | 653 |
| Example 8 | — | — | — | 98 | 2 | — | — | 54.0 | 914 |
| Comparative Example 4 | — | — | — | 100 | — | — | — | 51.5 | 635 |
| Comparative Example 5 | — | 98 | — | — | — | — | 2 | 73.0 | 737 |

As shown in Table 1, the composition obtained by blending fluoroalkyl group-containing alcohol with various kinds of polyether compounds has been remarkably improved in anti-seizure property, and also in high-temperature solubility. Compared with the case in which sulfur-based extreme pressure agent is blended, said composition exhibits a superior anti-seizure property. INDUSTRIAL APPLICABILITY As described above, the lubricating oil composition of the present invention provides an improved anti-seizure property and an improved high-temperature solubility. Accordingly, the lubricating oil composition of the present invention can be used as refrigerator oil, heat-pump oil, compressor oil, working oil or blake oil.

I claim:

1. A lubricating oil composition for use in a compression refrigerator comprising a fluoroalkyl group-containing alcohol represented by the general formula:

$$R_f R^1 - OH \quad (I)$$

wherein $R^1$ is an alkylene group having 2 to 15 carbon atoms, $R_f$ is a perfluoroalkyl group having 5 to 16 carbon atoms and at least one fluorine atom is bonded to each carbon atom in $R_f$, and a polyether compound where the fluoroalkyl group-containing alcohol is present from 0.1 to 30% by weight of the lubricating oil composition.

2. A process for effecting lubrication in a compression refrigerator using fluorohydrocarbon as the refrigerant which comprises employing a lubricant comprising the composition defined in claim 1 as the main component.

3. A compression refrigerator system which comprises a compressor, a refrigerant comprising fluorohydrocarbon, and a lubricant comprising the composition defined in claim 1 as the main component.

4. A lubricating oil composition according to claim 1, wherein $R^1$ is an alkylene group having from 2 to 10 carbon atoms.

5. A lubricating oil composition according to claim 1, wherein the boiling point of the fluoroalkyl group-containing alcohol is at least 140° C. at atmospheric pressure.

6. A lubricating oil composition according to claim 1, wherein the fluoroalkyl group-containing alcohol is at least one of perfluorohexylethyl alcohol, perfluorohexylbutyl alcohol and perfluorooctylethyl alcohol and the polyether compound has number-average molecular weight of about 300 to 3000.

7. A lubricating oil composition according to claim 1, wherein the polyether compounds are represented by the following formulae:

$$R^2-O-(AO)_m-R^3 \quad (II)$$
$$R^4-O-(AO)_f-(A'O)_g-R^5 \quad (III)$$

$$\begin{array}{l} CH_2-O-(AO)_h-R^6 \\ | \\ CH-O-(AO)_j-R^7 \\ | \\ CH_2-O-(AO)_k-R^8 \end{array} \quad (IV)$$

$$\begin{array}{l} CH_2-O-(AO)_p-(A'O)_r-R^9 \\ | \\ CH-O-(AO)_s-(A'O)_t-R^{10} \\ | \\ CH_2-O-(AO)_u-(A'O)_v-R^{11} \end{array} \quad (V)$$

wherein $R^2$-$R^{11}$ are each a hydrogen atom or an alkyl group having 1 to 10 carbon atoms, A and A' are each an alkylene group having 2 to 4 carbon atoms, m is an integer of at least 5, f+g is an integer of at least 5; h, j and k are each an integer of at least 2 and p+r, s+t and u+v are each an integer of at least 2.

* * * * *